United States Patent [19]

Hug et al.

[11] Patent Number: 5,026,146

[45] Date of Patent: Jun. 25, 1991

[54] SYSTEM FOR RAPIDLY PRODUCING PLASTIC PARTS

[76] Inventors: William F. Hug, 382 E. California Blvd., #106, Pasadena, Calif. 91106; Ray D. Reid, 1125 E. Foothill, #5, Glendora, Calif. 91740

[21] Appl. No.: 367,741

[22] Filed: Jun. 16, 1989

Related U.S. Application Data

[63] Continuation-in-part of Ser. No. 333,385, Apr. 3, 1989, abandoned.

[51] Int. Cl.⁵ ............................................. G11C 13/04
[52] U.S. Cl. ................................ 350/356; 346/77 R; 346/160; 350/360; 365/126
[58] Field of Search ............ 365/119, 111; 346/77 R, 346/160; 353/99, 122; 350/358, 3.63, 360, 361, 356, 355

[56] References Cited

U.S. PATENT DOCUMENTS

| | | | |
|---|---|---|---|
| 3,609,706 | 9/1971 | Adamson | 365/119 |
| 3,609,707 | 9/1971 | Lewis et al. | 365/119 |
| 4,023,969 | 5/1977 | Sheridon | 346/77 R |
| 4,041,476 | 8/1977 | Swainson | 365/119 |
| 4,078,229 | 3/1978 | Swainson et al. | 365/111 |
| 4,111,538 | 9/1978 | Sheridon | 353/99 |
| 4,238,840 | 12/1980 | Swainson | 365/119 |
| 4,333,165 | 6/1982 | Swainson et al. | 365/119 |
| 4,575,330 | 3/1986 | Hull | 365/119 |

*Primary Examiner*—Scott J. Sugarman
*Assistant Examiner*—Martin Lerner
*Attorney, Agent, or Firm*—W. Edward Johansen

[57] ABSTRACT

A system for rapidly producing a plastic part from a curable liquid which solidifies when subjected to ultra-violet light energy operates with a processor and computer aided design software. The system includes a receptacle and a moving mechanism which is electrically coupled to the processor. The receptacle stores the curable liquid part of which lies in a solidification plane. The system also includes an electronically erasable mask, a drawing device and a projecting system all of which are electrically coupled to the processor. The electronically erasable mask is an ultra-violet wavelength isolating image buffer. The drawing device may be a back lighted liquid crystal display or a high resolution cathode ray tube or an infrared diode laser raster scanner and electronically draws a plurality of images of successive cross-sectional laminae onto the electronically erasable mask. The projecting system projects ultra-violet light energy onto the electronically erasable mask so that the electronically erasable mask transfers frame-by-frame exposure of the plurality of images in order to reflect the ultra-violet light energy onto the curable liquid in the solidification plane thereby forming the successive cross-sectional laminae. The moving mechanism incrementally moves the cross-section laminae which are being formed in order to build up the plastic part in stepwise fashion.

4 Claims, 2 Drawing Sheets

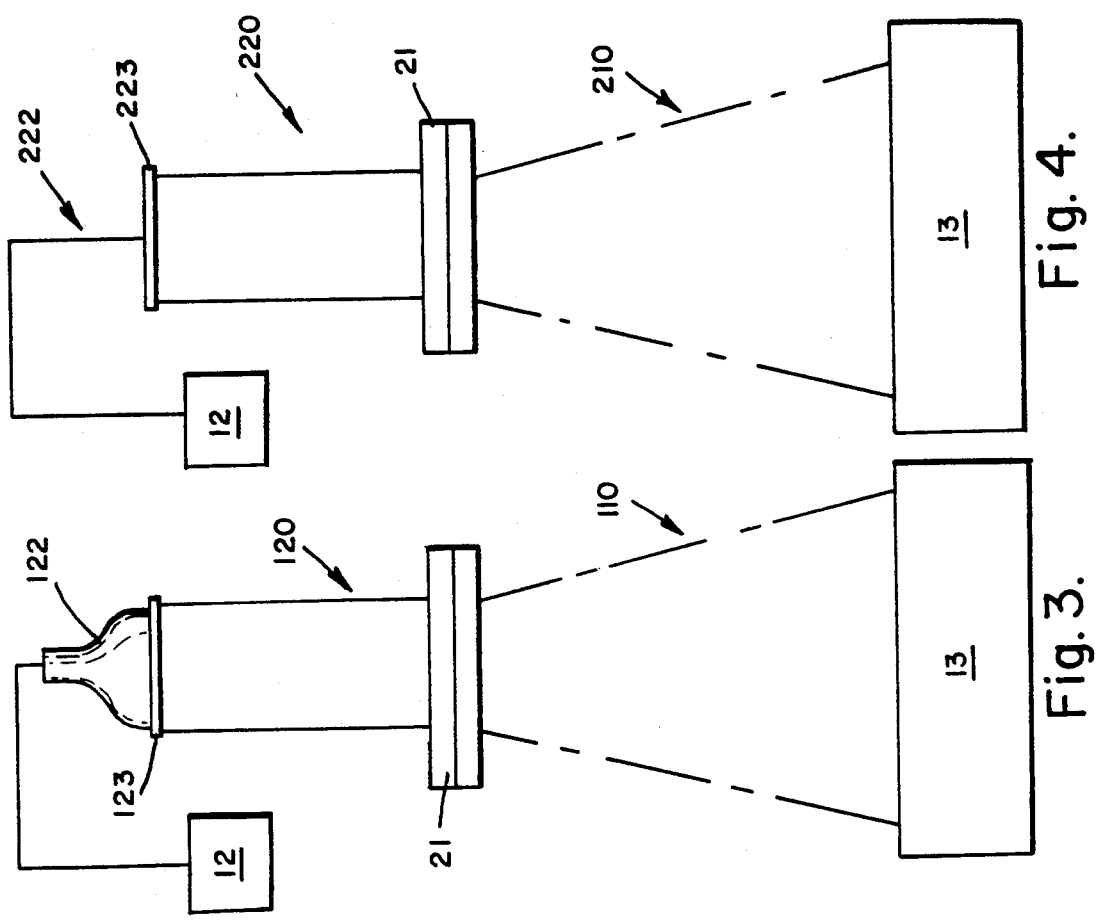
Fig. 4.
Fig. 3.
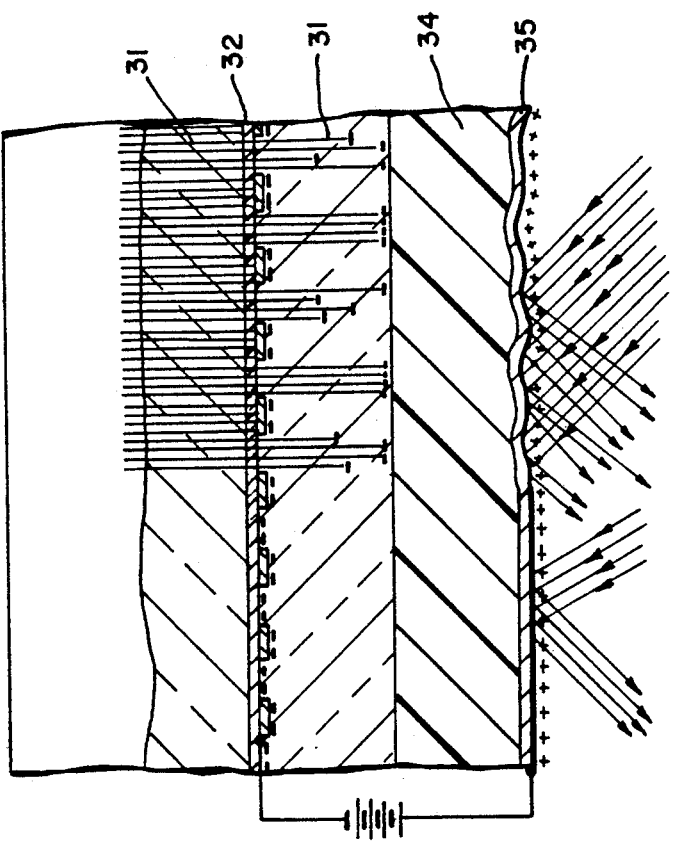
Fig. 2.

SYSTEM FOR RAPIDLY PRODUCING PLASTIC PARTS

This application is a continuation-in-part of an application filed on Apr. 3, 1989 under Ser. No. 333,385 now abandoned.

BACKGROUND OF THE INVENTION

1. Field of the Inventions

This invention relates to a system for rapidly producing a plastic part from a curable liquid which is capable of solidification when subjected to ultra-violet light energy and more particularly to an erasable mask for reflecting ultra-violet light energy onto the curable liquid by frame-by-frame exposure in order to produce the plastic part.

2. Description of the Prior Art

In the production of a plastic part it is common to first design the plastic part, then produce a prototype of the plastic part and finally review the design of the plastic part. This involves considerable time, effort, and expense. This process is repeated until the design of the plastic part has been optimized. After design of the plastic part has been optimized it must be produced. Most plastic parts are injection molded. Since the design and tooling costs of molds are very high, plastic parts are usually only practical if the production volume is high. While other processes are available for the production of plastic parts, including direct machine work, vacuum-forming and direct forming, such methods are typically only cost effective for short run production and these plastic parts are usually inferior in quality to molded plastic parts. In recent years techniques have been developed for generating a plastic part within a curable liquid which is selectively cured by beams of radiation brought to selective focus at prescribed intersection points within a three-dimensional volume of the curable liquid.

European Patent Application No. 87304865.6, entitled Three-Dimensional Modelling Apparatus, filed on June 2, 1987, teaches a modelling apparatus which includes a part generator, a workstation and a processing center. The workstation and processing center interface with a processor and computer aided design software, such as GEOMED of General Electric/Calma, CADS of Computervision, UNIGRAPHICS of McAuto, MEDUSA of Prime Computer or CIS. In his article entitled "Engineering without Paper," published in *High Technology*, in Mar. 1986, John K. Krouse describes and lists these computer aided design software programs. The workstation and processing center also provide an output to the part generator. The part generator includes a receptacle for the curable liquid, a source of ultra-violet light energy, a beam modulator and deflector. A reservoir supplies the curable liquid through a digitally controlled pump so that the curable liquid continues to lie in a solidification plane within the receptacle. The source of ultra-violet light energy may be either a laser or a strong arc lamp. The beam modulator and deflector receives data in raster forms, vector form or a combination of both. The curable liquid may be any suitable radiation polymerizable liquid which is commonly used in the coating and printing industries. The source of ultra-violet light energy may project an exposure through an erasable mask. The erasable mask may be either line-by-line exposure using an electro-optical shutter, such as a light switching array, or frame-by-frame exposure using a light valve in the form of a planar array, such as a liquid crystal display array. Unfortunately there are no light valves suitable for selectively allowing ultra-violet light energy to pass through because the planar array which must record and then erase images will be damaged by ultra-violet light energy which must pass through it in order to be projected onto the curable liquid in the solidification plane. Although line-by-line exposure is much slower than frame-by-frame exposure, the lack of a suitable light valve for ultra-violet light energy inhibits implementation of frame-by-frame exposure. The source of ultra-violet light energy may also project an exposure through a segment of a strip of film so that it impinges on the curable liquid in the solidification plane. The configuration of each layer of the plastic part is photographically recorded on one of the film segments. Each film segment has a micropositioning pattern thereon, such as perpendicularly extending Ronchi rulings, to align the layer of the plastic part with its preceding layer. Although the film segments provide frame-by-frame exposure and are suitable for ultra-violet light energy the use of the strip film is slower than use of an erasable mask providing frame-by-frame exposure.

U.S. Pat. No. 4,575,330, entitled Apparatus for Production of Three-Dimensional Objects by Stereolithography, issued to Charles W. Hull on Mar. 11, 1986, teaches a stereolithographic system which produces a plastic part from a curable liquid which solidifies when subjected to ultra-violet light energy. The stereolithographic system uses a source of ultra-violet light energy to provide a programmed movable spot of ultra-violet light energy on the surface of the curable liquid. The spot of ultra-violet light energy is moved either using cross-axis galvanometers with attached mirrors or an X-Y arm which moves the source of ultra-violet light energy. Each cross-sectional lamina is solidified on the surface of the curable liquid serially by scanning the spot of ultra-violet light energy directly on the curable liquid. U.S. Pat. No. 4,100,141 teaches a curable liquid which solidifies when subjected to ultra-violet light energy.

In his article entitled "Automatic Method for Fabricating a Three-Dimensional Plastic Model with Photohardening Polymer," published in *Review of Scientific Instruments*, Volume 52, Number 11, in Nov. 1981, Hideo Kodama discloses a system which automatically fabricates a plastic part by exposing a liquid photo-hardening polymer to ultra-violet light energy to create a plurality of cross-sectional solidified laminae and serially stacking the cross-sectional solidified laminae to form the plastic part. In his article entitled "Solid Object Generation," published in *Journal of Applied Photographic Engineering*, Volume 8, in 1982, Alan J. Herbert discloses a similar system which only fabricates a plastic part which is a solid of revolution.

U.S. Pat. No. 4,041,476, entitled Method, Medium and Apparatus for Producing Three-Dimensional Figure Product, issued to Wyn Kelly Swainson on Aug. 9, 1977, teaches an apparatus in which a plastic part is formed in situ in a medium having two active components by causing two radiation beams to intersect in the media. The beams trace surface elements of the figure product to be produced.

U.S. Pat. No. 4,078,229, entitled Three Dimensional Systems, issued to Stephen D. Kramer and Wyn K. Swainson on Mar. 7, 1978, teaches a method for producing plastic parts by the intersection of radiation beams.

U.S. Pat. No. 4,238,840, entitled Method, Medium and Apparatus for Producing Three Dimensional Figure Product, issued to Wyn K. Swainson on Dec. 9, 1980, teaches a method for forming a plastic part in situ in a liquid having two active components by causing two radiation beams to intersect in the media. The beams trace surface elements of the plastic part to be produced.

U.S. Pat. No. 4,288,861, entitled Three-Dimensional Systems, issued to Stephen D. Kramer and Wyn K. Swainson on Sept. 8, 1981, teaches a multiple beam absorption effect which creates plastic parts from a liquid medium. Two beams of optical electromagnetic radiation of a spectral characteristic which is matched to the excited state properties of the molecules of the active liquid medium may be either simultaneously or sequentially directed to a common target location to effect a desired photochemical reaction. U.S. Pat. No. 2,381,234, U.S. Pat. No. 2,525,532, U.S. Pat. No. 2,775,758, U.S. Pat. No. 3,609,707, U.S. Pat. No. 3,723,120, U.S. Pat. No. 4,081,276, U.S. Pat. No. 4,252,514 and U.S. Pat. No. 4,466,080 are other relevant patents.

U.S. Pat. No. 4,391,499, entitled Image Projector, issued to William C. Whitlock on July 5, 1983, teaches an image projector which creates a three-dimensional image. The image projector includes a plurality of modules which are controllably illuminated to form the desired display. The modules are formed to be illuminated and to pass light from within through their walls and to prevent light from entering their outer walls when the modules are not illuminated.

In an article, entitled Optical Processing with the Ruticon, written by Nicholas K. Sheridon and Michael A. Berkovitz, published in SPIE, Volume 83, Optical Information Processing, Ruticons are optically addressed light valves for image storage and optical processing applications. A wide range of image storage times and sensitivities are obtainable depending upon the desired applications.

U.S. Pat. No. 3,716,359, entitled Cyclic Recording System by the Use of an Elastomer in an Electric Field, issued to Nicholas K. Sheridon on Feb. 13, 1973, U.S. No. 3,842,406, entitled Cyclic Recording System by the Use of an Elastomer in an Electric Field, issued to Nicholas K. Sheridon on Oct. 15, 1974, and U.S. Pat. No. 3,853,614, entitled Cyclic Recording System by the Use of an Elastomer in an Electric Field, issued to Nicholas K. Sheridon on Dec. 10, 1974, teach applications of Ruticons, which are elastomers, to various imaging techniques which may be used for the cyclic recording, storage and subsequent erasure of optical information to form images by the elastic deformation of a thin elastomer layer. The pattern of the surface deformation, in general, follows the light distribution of the optical image being recorded. This image is formed on a photoconductive layer which is adjacent to, or integral with, the elastomer layer. An electric field is placed across the elastomer and the photoconductor layers so that the field is modulated by the action of the image light on the conductivity of the photoconductor to provide the mechanical force necessary to deform the elastomers. Once the elastomer surface has deformed, it will in general remain deformed as long as the field across it is maintained. The image recorded is stored. Removing the electric field allows the elastomer to relax and the image is consequently erased. Reversing the field increases the rate at which the image is erased. A new image may now be formed and the cycle started over again. Such an elastomer material is capable of a great many recording/storage/erasure cycles.

U.S. Pat. No. 4,023,969, entitled Deformable Elastomer Imaging Member Employing an Internal Opaque Deformable Metallic layer, issued to Nicholas K. Sheridon on May 17, 1977, teaches an imaging member of an imaging system which includes a pair of deformable layers and a deformable metallic layer which is arranged between the pair of deformable layers. At least one of the deformable layers includes an elastomer material. In operation an electrical field is established across the deformable layers to cause deformation thereof in imagewise configuration. The imaging member may include photoconductive material and may include a pair of electrodes for establishing an electrical field across the deformable layers. The electrodes include an electrical x-y matrix address system.

U.S. Pat. No. 4,111,538, entitled Projection System of High Frequency, issued to Nicholas K. Sheridon on Sept. 5, 1978, teaches a light system for projection of images onto a visual read out surface such as a screen or photo receptor recording device such as a xerographic drum. The projection system employs a non-point light source which forms a light beam of non-uniform intensity. The light beam is passed through a conical light pipe with a high degree of internal reflection which diffuses the light beam, thereby reducing the non-uniformity of the light beam and also collimates the light beam by internal reflections. The collimated light beam is then modulated with imaging information and is focused onto a visual readout surface such as a screen or a recording device surface.

U.S. Pat. No. 3,932,025, entitled Imaging System, issued to Andras I. Lakatos and John B. Flannery on Jan. 13, 1976, teaches an imaging system which forms a plurality of images on the same surface. The imaging system includes an electro-optic imaging member which includes a voltage or current-sensitive light modulating layer, a layer of photoconductive material which exhibits persistent photoconduction properties and a layer of material capable of generating photoinjection currents when struck by radiation which it absorbs.

U.S. Pat. No. 4,099,262, entitled Automatic Memory Control Feedback System for a Cycling Optical Imaging System, issued to Clark I. Bright on July 4, 1978, teaches a system which alters the deformation of a cyclic imaging member. The system includes a deformable member and a circuit. The deformable member has a deformable surface which has been arranged to be placed in an initial deformed position by the application of an input. The circuit is responsive to the extent of the deformation of the deformed surface for altering the deformation of the surface.

U.S. Pat. No. 4,448,505, entitled Arrangement for Addressing Rays or Planes of Light in Space, issued to Paul DiMatteo on May 15, 1984, teaches an arrangement which projects a sequence of coded patterns onto an object surface and which includes a code generator and a single light source. The code generator has a plurality of addressable light attention regions. The single light source irradiates the code generator. Each region of low attenuation resulting from addressing produces illumination of a corresponding part of the projected coded pattern. The code pattern is projected onto the object surface by passing electromagnetic radiation though the code generator. The purely electrical commands address rays or planes of light in space without the need for mechanically moving parts.

SUMMARY OF THE INVENTION

In view of the foregoing factors and conditions characteristic of the prior art it is the primary object of this invention to provide a system for rapidly producing a plastic part from a curable liquid capable of solidification when subjected to ultra-violet light energy.

It is another object of the present invention to provide a system for rapidly producing a plastic part which includes an erasable mask for reflecting ultra-violet light energy onto a curable liquid by frame-by-frame exposure rather than by line-by-line exposure.

In accordance with an embodiment of the present invention a system for rapidly producing a plastic part from a curable liquid capable of solidification when subjected to ultra-violet light energy is described. The system operates with a processor and computer aided design software and includes a receptacle and a moving mechanism which is electrically coupled to the processor. The receptacle stores the curable liquid part of which lies in a solidification plane. The system also includes an electronically erasable mask, a drawing device and a projecting system all of which are electrically coupled to the processor. The electronically erasable mask is an ultra-violet wavelength isolating image buffer. The drawing device may be a back lighted liquid crystal display or a high resolution cathode ray tube or an infrared diode laser raster scanner and electronically draws a plurality of images of successive cross-sectional laminae onto the electronically erasable mask. The projecting system projects ultra-violet light energy onto the electronically erasable mask so that the electronically erasable mask transfers frame-by-frame exposure of the plurality of images in order to reflect the ultra-violet light energy onto the curable liquid in the solidification plane thereby forming the successive cross-sectional laminae. The moving mechanism incrementally moves the cross-section laminae which are being formed in order to build up the plastic part in stepwise fashion.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 2 is a cross-sectional view of the erasable mask of FIG. 1.

FIG. 3 is a partial schematic drawing of a second system for rapidly producing a plastic part from a curable liquid which solidifies when subjected to ultra-violet light energy which includes a high resolution cathode ray tube and an erasable mask for reflecting ultra-violet light energy onto the curable liquid by frame-by-frame exposure in order to produce the plastic part and which has been constructed in accordance with the principles of the second embodiment of the present invention.

FIG. 4 is a partial schematic drawing of a second system for rapidly producing a plastic part from a curable liquid which solidifies when subjected to ultra-violet light energy which includes a back lighted liquid crystal display and an erasable mask for reflecting ultra-violet light energy onto the curable liquid by frame-by-frame exposure in order to produce the plastic part and which has been constructed in accordance with the principles of the second embodiment of the present invention.

DESCRIPTION OF THE PREFERRED EMBODIMENT

Figure 1:
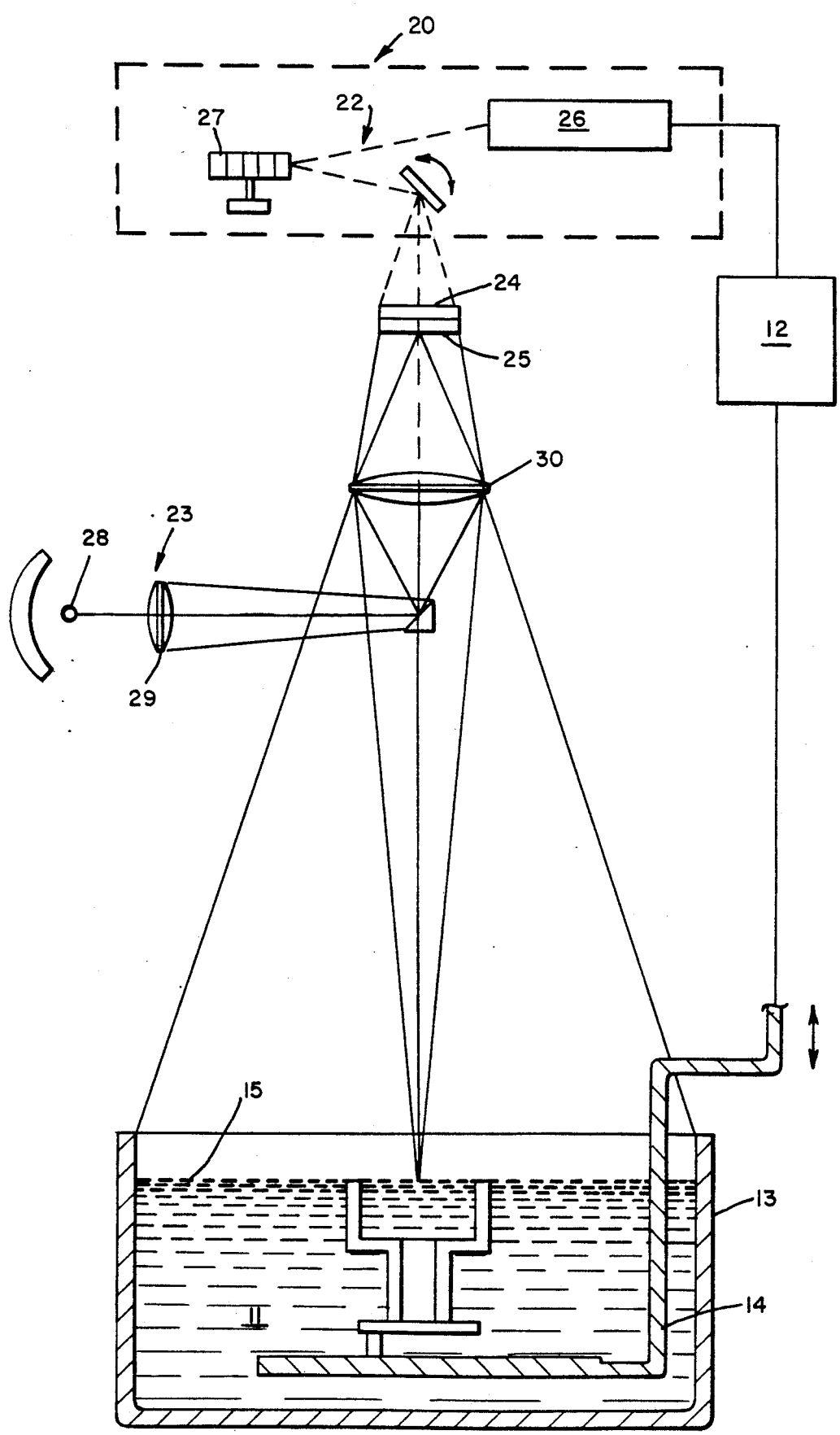
FIG. 1 is a schematic drawing of a processor and a first system for rapidly producing a plastic part from a curable liquid which solidifies when subjected to ultra-violet light energy which includes an infrared diode laser raster scanner and an erasable mask for reflecting ultra-violet light energy onto the curable liquid by frame-by-frame exposure in order to produce the plastic part and which has been constructed in accordance with the principles of the first embodiment of the present invention.

In order to best understand the present invention it is necessary to refer to the following description of its preferred embodiment in conjunction with the accompanying drawing. Referring to FIG. 1 in conjunction with FIG. 2 a system 10 for rapidly producing a plastic part from a curable liquid 11 which solidifies when subjected to ultra-violet light energy operates with a processor 12 and computer aided design software. European Pat. Application No. 87304865.6 teaches a processor and computer aided design software. U.S. Pat. No. 4,100,141 teaches a curable liquid which solidifies when subjected to ultra-violet light energy. The principles of computer generated graphics are combined with the curable liquid to simultaneously execute computer aided design software to produce plastic parts directly from computer instructions. Many of the key elements of the system 10 are the same as those elements which U.S. Pat. No 4,575,330 describes. The processor 12 is used to generate the sequence of two-dimensional images of individual cross-sectional laminae of the plastic part. In sequence, these two-dimensional images are read out of the processor 12 into any of several image generation devices such as a back lighted liquid crystal display or cathode ray tube or an infrared diode laser raster scanner or a visible laser raster scanner or a vector scanner. The system 10 includes a receptacle 13 and a movable elevator platform 14 which is electrically coupled to the processor 12. U.S. Pat. No. 4,575,330 teaches a movable elevator platform which is electrically coupled to a processor. The receptacle 13 stores the curable liquid 11 part of which lies in a solidification plane 15. A reservoir may supply the curable liquid 11 through a digitally controlled pump so that the curable liquid 11 continues to lie in a solidification plane 15 within the receptacle 13.

Referring to FIG. 1 in conjunction with FIG. 2 the system 10 includes a first optical system 20 which transfers the image which is stored in the ultra-violet wavelength isolating image buffer onto the solidification plane 15 of the curable liquid 11. The first optical system 20 includes an electronically erasable mask 21, a first drawing device 22 and a projecting system 23 all of which are electrically coupled to the processor 12. The electronically erasable mask 21 is an ultra-violet wavelength isolating image buffer which has an input surface 24 and an output surface 25 and which is often referred to as a Ruticon. The first drawing device 22 is a combination of an infrared diode laser 26 and a laser raster scanner 27 and draws electronically a plurality of images of successive cross-sectional laminae onto the electronically erasable mask 21. The projecting system 23 includes a compact arc lamp 28, either mercury vapor or mercury/xenon, a condenser lens 29.

The condenser lens 29 collects and collimates the ultra-violet light energy from the compact arc lamp 28 in order to direct the ultra-violet light energy to the output surface 25 of the ultra-violet wavelength isolating image buffer. The infrared diode laser 26 is controlled by the processor 12 and is used to select the exposure time required to form a solidified image on surface of the curable liquid 11. When no image is stored in the ultra-violet wavelength isolating image buffer the ultra-violet light energy from the arc lamp 28 is focused on a zero order stop. The projecting system 23 generates ultra-violet light energy which is collimated and directed onto the output surface 25 of the ultra-violet wavelength isolating image buffer. The first optical system 20 is a Schlieren type system and blocks light which is reflected from non-wrinkled portions of the output surface 25, or portions thereof which contain no image information. The first optical system 20 also includes an imaging lens 30 which forms a collimating of the output surface 25 on the surface of the curable liquid 11 in the solidification plane 15 and which also forms a focus for non-diffracted light at a zero order stop. When the output surface 25 of the ultra-violet wavelength isolating image buffer contains no image information, all of the ultra-violet light energy is focused on the zero order stop, and none of the ultra-violet light energy is imaged onto the curable liquid 11. When image information is present on the output surface 25 of the ultra-violet wavelength isolating image buffer, the output surface 25 of the ultra-violet wavelength isolating image buffer diffracts the ultra-violet light energy incident on the image carrying portions of the output surface 25 and causes this light to diffract around the zero order stop and form an ultra-violet image on the surface of the curable liquid 11 so that the electronically erasable mask 21 transfers frame-by-frame exposure of the plurality of images in order to reflect the ultra-violet light energy onto the curable liquid 11 in the solidification plane 15 thereby forming the successive cross-sectional laminae. The movable elevator platform 14 incrementally moves the cross-section laminae which are being formed in order to serially stack the plurality of cross-sectional solidified laminae to form the plastic part. In another embodiment the projecting system 23 may be a laser system.

The ultra-violet wavelength isolating image buffer has properties which are ideal for this application and can be constructed to allow two-dimensional information to be optically addressed on its input surface. The ultra-violet wavelength isolating image buffer is a laminated structure which includes a transparent glass substrate 31, a transparent coating 32, a photoconductive coating 33, an elastomer layer 34 and a conductive reflective layer 35. The transparent glass substrate 31 is used as its base of a Ronchi ruling formed onto the inner side of the laminated structure. The transparent conductive coating 32 is formed over the ruled glass substrate 31 to form a transparent electrode. Over the ruled glass substrate 31 and the conductive coating 32 is the photoconductive coating 33 which forms its optically addressable portion. This photoconductive coating 33 can be any of several types including PVK-TNF, amorphous silicon or selenium, depending of the type of light source to be used to optically address the ultra-violet wavelength isolating image buffer. Over the photoconductor 33 is the elastomer layer 34 which is a deformable material. And finally the last layer is the conductive reflective layer 35. This conductive reflective layer 35 is typically a thin metal layer. When an image is formed on the photoconductive coating 33 using the first drawing device 22 an electrical charge distribution is created corresponding to the image. Corresponding to the electrical charge distribution the conductive reflective layer 32 on the output surface 25 of the ultra-violet wavelength isolating image buffer is distorted into "wrinkles" or waves. These waves form a diffraction grating wherever the image information is present. U.S. Pat. No. 3,932,025 described the ultra-violet wavelength isolating image buffer and teaches the details of the function and operation of the ultra-violet wavelength isolating image buffer.

The advantages of the ultra-violet wavelength isolating image buffer as an image buffer device is that the photoconductive surface 32 of the image buffer is optically isolated from the ultra-violet light energy. Therefore the photoconductive surface 32 which receives the optical image information on the input side of the ultra-violet wavelength isolating image buffer is neither damaged nor saturated by ultra-violet light energy of an intensity which is present on its output surface 25. Other image buffer devices such as a liquid crystal display which is used as a light valve do not have such optical isolation of input and output and are damaged by the presence of ultra-violet light energy and can therefore can not be used for this type of application.

Referring to FIG. 3 in conjunction with FIG. 1 and FIG. 2 the system 10 may include a second optical system 120 which transfers the image which is stored in the ultra-violet wavelength isolating image buffer onto the solidification plane 15 of the curable liquid 11. The second optical system 120 includes an electronically erasable mask 21, a second drawing device 122 and a projecting system 23 all of which are electrically coupled to the processor 12. The second drawing device 122 is a cathode ray tube 123 which optically addresses the ultra-violet wavelength isolating image buffer. The cathoe ray tube would be a standard monochrome high resolution cathode ray tube. Other image input systems could be laser vector scanners and a helium-neon laser with an acousto-optic light modulator.

Referring to FIG. 4 in conjunction with FIG. 1 and FIG. 2 the system 10 may include a third optical system 220 which transfers the image which is stored in the ultra-violet wavelength isolating image buffer onto the solidification plane 15 of the curable liquid 11. The third optical system 220 includes an electronically erasable mask 21, a third drawing device 222 and a projecting system 23 all of which are electrically coupled to the processor 12. The third drawing device 222 is a backlighted liquid crystal display 223 which optically addresses the ultra-violet wavelength isolating image buffer. A computer generated image of a two-dimensional cross-section of an individual lamina or slice of the three-dimensional object is formed in the processor 12 and read out of the processor 12 in serial fashion into the backlighted liquid crystal display 222. The image of the backlighted liquid crystal display 222 is formed on the input surface 24, which is photoconductive, of the ultra-violet wavelength isolating image buffer. This image is stored in the ultra-violet wavelength isolating image buffer. The third optical system 220 is used to transfer an image from the output surface 25 of the ultra-violet wavelength isolating image buffer onto the surface of the curable liquid 11. The image stored in the ultra-violet wavelength isolating image buffer is of one two-dimensional lamina cross-section to be solidified on the surface of the curable liquid 11. Any one of these image generation devices is used to optically address the ultra-violet wavelength isolating image buffer which stores the image for later full frame imaging onto the surface of the curable liquid 11.

When an image is present in the ultra-violet wavelength isolating image buffer, an ultra-violet image is formed on the surface of the curable liquid 11 which causes the image to solidify on its surface. After the formation of a solidified image on surface of the curable liquid, an movable elevator platform 14 inside receptacle 13 can be moved up and down selectively, the position of the platform being controlled by the processor 12. As the system 10 operates, it produces a plastic part by step-wise buildup of integrated laminae. The surface of the curable liquid 11 is maintained at a constant level in the receptacle 13. The ultra-violet light image formed on the surface of the curable liquid 11 is of sufficient intensity to cure the curable liquid 11 and convert it to a solid material. After the solid lamina is formed the movable elevator platform 14 that was initially just below the surface is moved down from the surface in a programmed manner by any suitable actuator. In this way, the solid material that was previously formed is taken below surface and new curable liquid 11 flows across the surface. The movable elevator platform 14 is then positioned by the processor so that the solidified liquid previously formed is positioned just below surface by an amount equal to one lamina thickness. This new liquid lamina is then converted to solid by exposure to the ultra-violet full frame image projected from the ultra-violet wavelength isolating image buffer for the next lamina and is automatically connected adhesively to the solid material below it. This process is continued until the entire plastic part is formed. The plastic part is then removed from the receptacle 13, and the system 10 is ready to produce another plastic part. Another plastic part can be produced, or some new plastic part can be made by changing the program in the processor 12. The processor 12 has two basic functions which are to help the operator design the plastic part in a way that it can be made and to translate the design into commands that are appropriate for the other components of the system in order to deliver these commands in a way so that the plastic part is formed. In some applications, the object design will exist, and the only function of the processor 12 will be to deliver the appropriate commands. In the ideal situation, the operator will be able to design the object and view it isometrically on the cathode ray tube cathode ray tube screen of the processor 12. When he is finished with the design, he will instruct the processor 12 to make the plastic part, and the processor 12 will issue the appropriate instructions to the other components of the system 10. Commercial systems will have additional components and subsystems.

From the foregoing it can be seen that a system for rapidly producing a plastic object has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. A system for rapidly producing a plastic part from a curable liquid which solidifies when subjected to ultra-violet light energy in combination with a processor and computer aided design software, said system comprising:
   a. a receptacle for storing the curable liquid which lies in a solidification plane within said receptacle;
   b. an electronically erasable mask which is an ultra-violet is an ultraviolet wavelength isolating image buffer and which is electrically coupled to the processor;
   c. drawing means for electronically drawing a plurality of images of successive cross-sectional laminae onto a Ruticon, said drawing means being electrically coupled to the processor;
   d. projecting means for projecting ultra-violet light energy onto said Ruticon that said Ruticon transfers frame-by-frame exposure of said plurality of images in order to reflect said ultra-violet light energy onto the curable liquid in said solidification plane thereby forming said successive cross-sectional lamina; and
   e. moving means for incrementally moving said cross-section laminae which are being formed in order to build up the plastic part in stepwise fashion.

2. A system for rapidly producing a plastic part according to claim 1 wherein said drawing means comprises an infrared diode laser raster scanner.

3. A system for rapidly producing a plastic part according to claim 1 wherein said drawing means comprises a high resolution cathode ray tube.

4. A system for rapidly producing a plastic part according to claim 1 wherein said drawing means comprises a back lighted liquid crystal display.

* * * * *